Sept. 28, 1926.  E. B. CAMPBELL  1,601,556
TRACTOR
Filed August 18, 1924
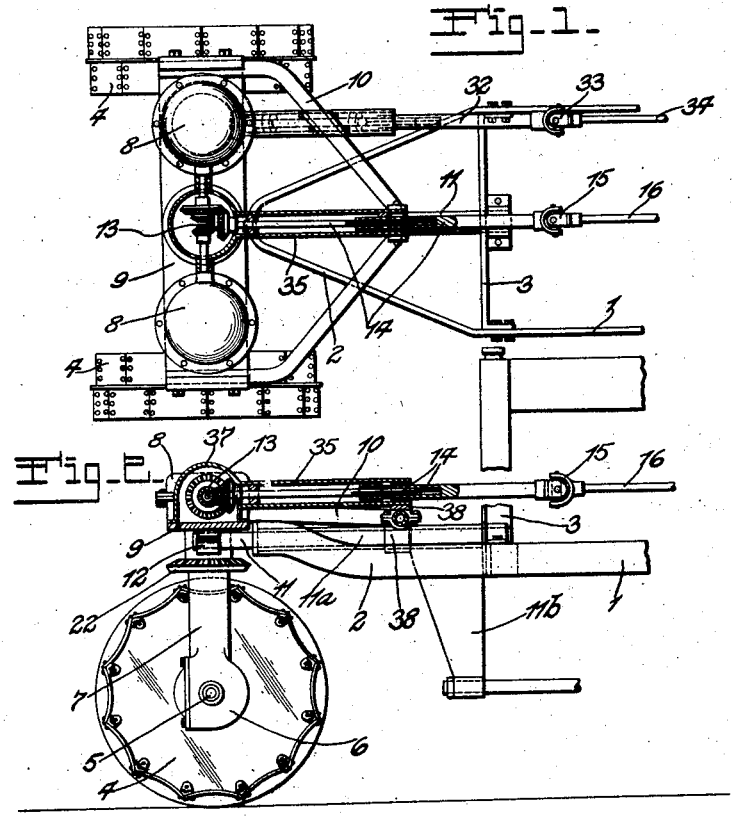
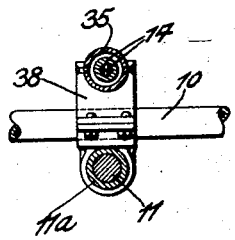
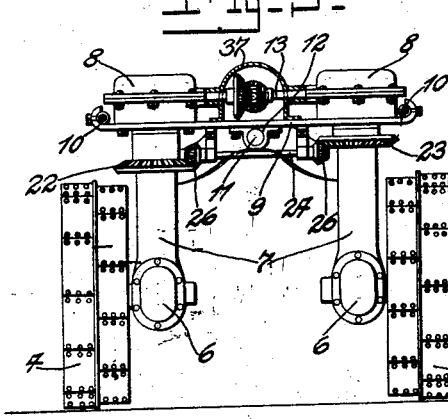
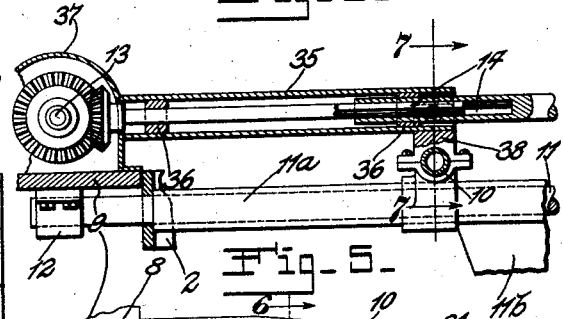
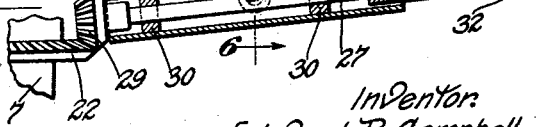
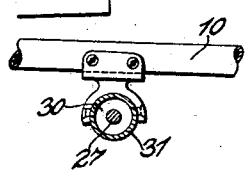
Inventor:
Edward B. Campbell,
by Rippey & Kingsland
His Attorneys.

Patented Sept. 28, 1926.

1,601,556

UNITED STATES PATENT OFFICE.

EDWARD B. CAMPBELL, OF ST. LOUIS, MISSOURI.

TRACTOR.

Application filed August 18, 1924. Serial No. 732,865.

This invention relates to tractors.

An object of the invention is to provide a tractor embodying mechanism constituting a solution of the problem of providing front steering wheels driven by the motor, and means for connecting the mountings of the steering wheels to the tractor frame so that said steering wheels may accommodate themselves to the unequalities of the ground without interfering with proper operation for the driving connections and the devices for controlling the steering wheels.

Another object of the invention is to provide a tractor having a pair of steering wheels mounted in connection with the steering wheel frame, and means for connecting said steering wheel frame to the rigid tractor frame to permit said steering wheel frame to turn to different positions to permit the steering wheels to travel properly upon uneven ground and at the same time to subject to proper control by the steering devices.

Other objects will appear from the following description, reference being made to the drawing in which Fig. 1 is a plan view of the invention with parts of the transmission mechanism shown in section.

Fig. 2 is a side elevation of parts of the transmission mechanism shown in section.

Fig. 3 is a front elevation of the housing, with the steering wheel differential mechanism shown in section.

Fig. 4 is an enlarged sectional view of a part of the transmission mechanism.

Fig. 5 is an enlarged sectional view of a part of the steering devices controlling the steering wheels.

Fig. 6 is a sectional view on the line 6—6 of Fig. 5.

Fig. 7 is a sectional view on the line 7—7 of Fig. 4.

The tractor frame 1 is of rigid construction and is supported by the rear wheels. Said frame is designed and formed so that the steering wheel frame may obtain pivotal connection with the front end thereof so as to permit the steering wheels as well as the rear tractor wheels to adjust themselves as required by the inequality of the ground over which the tractor travels. Preferably the front end 2 of the frame 1 is tapered in plan view with the extreme forward front portion thereof raised above the remaining portion. A cross member 3 is attached to the frame 1 approximately in the plane of the raised front end of said frame.

In the embodiment of the invention shown there are two front steering wheels 4 attached to axle members 5 journaled for rotation in the lower ends of housings 6 and driven by connections in sleeves 7 and gear housings 8—all substantially as disclosed in my copending application Serial No. 724,948, filed July 9, 1924. The sleeves 7 and housings 8 are in connection with a frame comprising a strong cross member 9 and a bifurcated member 10, the forward extremities of the diverging arms of which are rigidly attached to said cross member 9. A shaft 11 has its front end in a bracket 12 attached to the cross member 9 and extends rearwardly through the front end of the tapered part 2 of the tractor frame and through a sleeve 11$^a$, the rear end of which is attached to the member 10 and thence through the cross member 3 of the tractor frame. The frame 9—10 is capable of rocking movements with or about the shaft 11 so that as the tractor travels over uneven ground the steering wheels 4, as well as the rear tractor wheels, may adjust themselves to the unevenness of the ground without subjecting the frame to undue strains. A purpose of raising the front end of the tapered portion 2 of the tractor frame is to permit the frame part 10 to be supported a sufficient distance above the frame part 2 to permit movement of the parts when passing over uneven ground without abutting engagement of the frame parts. The shaft 11 supports a part 11$^b$ of the tractor mechanism.

The differential mechanism 13 of the steering wheels is driven by transmission mechanism comprising telescoping shaft members 14 one of which drives the other irrespective of the telescoping adjustments of said parts. One of the members 14 closest the motor has swivel driving connection 15 with a transmission shaft 16.

As disclosed in my said application the sleeves 7 have gear wheels 22 and 23 attached thereto respectively, one of which is turned by the other by a shaft 24 having pinions 26 meshing with the gears 22 and 23 in the relationship shown.

A steering rod member 27 has a pinion 29 on one end meshing with the gear wheel

22. The steering rod member 27 is supported in bearings 30 and is enclosed within a sleeve 31 and has sliding telescoping connection with another steering rod member 32. The latter has universal pivot connection 33 with a rod 34. The sleeve 31 is secured to the frame members 9 and 10 and permits proper adjustments of the parts as required when the tractor passes over uneven ground.

The shaft member 14 that has gear connection with the differential gearing 13 is enclosed within a housing 35 and is incapable of longitudinal movement. A housing 35 supports bearings 36 in which the shaft 14 rotates. The front shaft of the housing 35 is supported by and opens into the differential housing 37, while the rear end of the housing 35 is supported by a bracket 38 in connection with the frame member 10.

I am aware that the form and arrangement of the parts comprising the invention may be varied without departure from the nature and principle thereof.

I do not restrict myself unessentially, but what I claim and desire to secure by Letters Patent is:—

1. A tractor comprising a main frame, a pair of front steering wheels, a front frame supported by said steering wheels and extending rearwardly beyond the front end of said main frame, a transmission shaft supported for rotation in said front frame, differential gearing for driving said steering wheels from said transmission shaft, and a horizontal shaft below said transmission shaft, engaging each of said frames at two places and pivoting said two frames together and permitting either to tilt to inclined positions relative to the other, one of said places of engagement with each frame being between the two places of engagement with the other frame.

2. A tractor comprising a main frame, a pair of front steering wheels, a front frame supported by said steering wheels and extending rearwardly beyond the front end of said main frame, a transmission shaft rotative in said front frame, differential gearing for driving said steering wheels driven by said transmission shaft, means supported by said front frame for steering said wheels, and a horizontal shaft below said transmission shaft engaging each of said frames at two places and pivoting said two frames together and permitting either to tilt to inclined positions relative to the other, one of said places of engagement with each frame being between the two places of engagement with the other frame.

3. A tractor comprising a rear frame having the sides of its forward end converging in tapered relationship, a front frame extending rearwardly beyond the front end of the rear frame, steering wheels supporting the front frame, pivot means engaging each of said frames at two places one of said places of engagement with each frame being between the two places of engagement with the other frame, a transmission shaft supported by said front frame above said pivot means, differential gearing for said steering wheels driven by said transmission shaft, a transverse shaft supported by said front frame below the plane of said pivot means, connections for steering one of said steering wheels, gearing for operating said horizontal shaft from said connections, and gearing for steering the other steering wheel from said horizontal shaft.

EDWARD B. CAMPBELL.